REPEATER STATION HAVING REDUCED SELF OSCILLATION

Filed Oct. 12, 1945

INVENTORS
Donald G. C. Hare
Hector R. Skifter
BY
Ralph L. Chappell
ATTORNEY 2,875,328

REPEATER STATION HAVING REDUCED SELF OSCILLATION

Donald G. C. Hare, Greenvale, and Hector R. Skifter, Manhasset, N. Y., assignors to the United States of America as represented by the Secretary of the Navy Application October 12, 1945, Serial No. 622,054

3 Claims. (Cl. 250—15)

This invention relates to radio repeaters. The object is to provide an improved repeater system in which the tendency to oscillate due to feedback from the transmitting antenna to the receiving antenna is minimized.

In accomplishing the invention, the received signal is heterodyned to an intermediate frequency using a local oscillator in the conventional manner. The intermediate frequency signal when amplified is converted for transmission using a signal from the same local oscillator. Both the repeated signal and its "image" are transmitted, and when the local oscillator frequency is greater than that of the intermediate frequency, the image signal has a frequency greater than the received signal by an amount equal to twice the intermediate frequency signal. The repeated and image signals inherently are fed back to the receiving antenna, and should be equal in amplitude at the input converter. According to this invention, the oscillator signal at the output mixer is critically phased relative to the oscillator signal for the input converter. The phasing is such that the two difference-frequency signals, which result at the input converter from the mixing of the oscillator signal with the two transmitted sidebands, are mutually canceling. The tendency of the repeater to oscillate is thus largely eliminated. This system is especially useful for repeaters of broad-band design, where antenna phasing is difficult or impossible.

Figure 1:
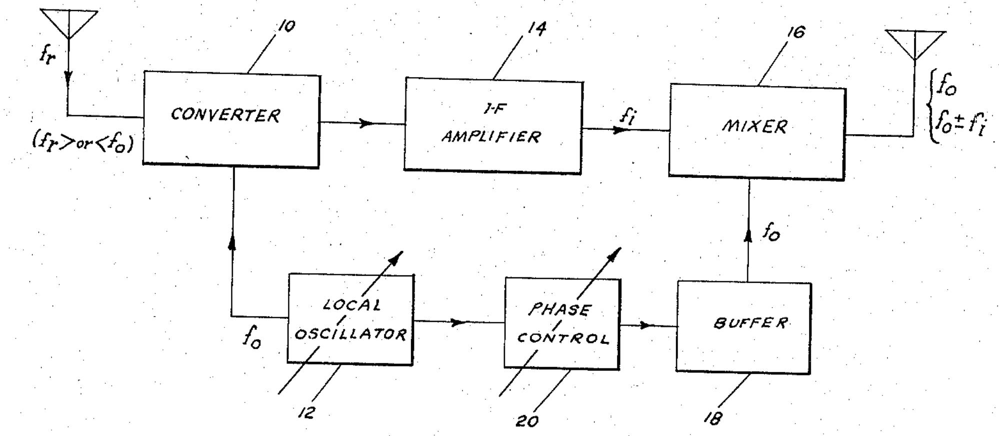
Figure 2:
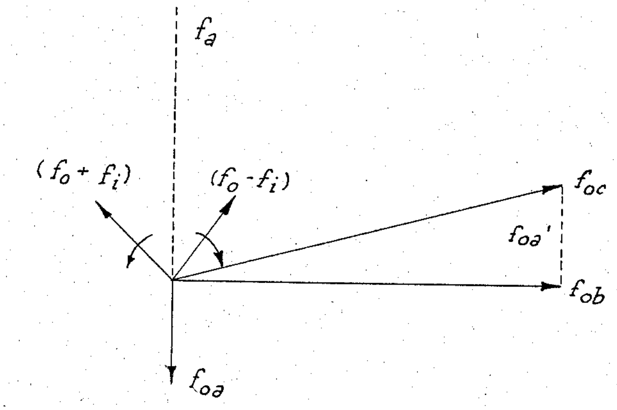

The invention will be better understood from the following detailed disclosure in which:

Fig. 1 is a block diagram of an illustrative system embodying the invention; and Fig. 2 is a vector diagram of various frequency components at the input converter.

As shown in Fig. 1, a received signal of frequency $f_r$ appears at input converter 10, together with a signal $f_o$ from local oscillator 12, and the resulting difference-frequency $f_i$ is applied to intermediate-frequency amplifier 14. The intermediate-frequency signal is heterodyned in mixer 16 with a signal from oscillator 12 to provide transmitted sidebands $(f_o \pm f_i)$ one of which equals $f_r$ in frequency, the other being a transmitted image frequency. In addition, a carrier signal $f_o$ will be passed if unit 16 is not designed as a balanced mixer. The local oscillator signal for mixer 16 is derived through a buffer 18 to prevent the signals in the mixer from affecting local oscillator 12, and through phase control 20 the purpose and adjustment of which will hereafter be explained.

Intermediate-frequency amplifier 14 preferably has a broad frequency range extending substantially to zero, and converter 10 and mixer 16 and possibly buffer 18 are of broad-band design, with local oscillator 12 adjustable in frequency. While the present invention is primarily valuable in broad-band application, it is not limited thereto. It is, however, a practical requirement that the repeater should, over all, emit and respond to the transmitted image of a signal equally with its response to the relayed signal itself, as will be seen. The transmitted sidebands may be unequal, provided that there is compensation at the input end of the repeater.

The purpose of phase control 20 is to prevent the repeater from oscillating. To test the tendency of the system to oscillate, apart from accomplishing its function as a repeater, it may be assumed that a signal $f_i$ appears in intermediate frequency amplifier 14. This signal is applied with oscillator signal $f_o$ to mixer 16 to produce sideband frequencies $(f_o+f_i)$ and $(f_o-f_i)$. Only if mixer 16 is perfectly balanced, will there be no signal of frequency of $f_o$ in the output. Signals $(f_o+f_i)$ and $(f_o-f_i)$ from the mixer are transmitted and appear at the repeater input. They are represented in Fig. 2 as vectors contrarotating at frequency $f_i$, which in the normal case remain symmetrical relative to the transmitted oscillator voltage represented by stationary vector $f_{oa}$. The line of symmetry $f_a$ of the two sidebands replaces vector $f_{oa}$ as a preference line when $f_{oa}$ is reduced to zero, or when $f_{oa}$ is at an angle to line of symmetry $f_a$. To obtain the transmitted signal trace, it is merely necessary to find the sine-variation of the instantaneous vectors shown when the diagram is caused to rotate at the oscillatory frequency.

It can be shown that the two difference-frequency signals, resulting at the input converter from mixing the oscillator signal with the above-described pair of equal-amplitude sidebands, are mutually canceling provided that the resultant oscillator signal used in the conversion is in quadrature with the line of symmetry of the sidebands. This resultant oscillator signal is represented in Fig. 2 by the vector $f_{ob}$. The actual oscillator signal $f_{oc}$ must be phased substantially to cancel the component of oscillator frequency $f_{oa}$ among the received signals, should any such component be present. The resultant oscillator-frequency signal $f_{ob}$ is the vector sum of the actual oscillator signal $f_{oc}$ and the replica $f_{oa}'$ of $f_{oa}$. In the general case, the transmitted oscillator-frequency component need not coincide with the line of symmetry $f_a$ as shown. The cancellation is true for as many symmetrical pairs of sidebands as are considered, with the same phase of resultant oscillator signal: at right angles to the common line of symmetry.

The transmitted signals originate as symmetrical sidebands, and some symmetry—not necessarily an unchanged symmetry—must be preserved in the feedback loop despite the unavoidable phase shifts. The transmitting antenna, the receiving antenna, the space between the two, and certain components of the input converter and the output mixer are all factors which cause phase shift of the transmitted signals as detected by the repeater. The phase shifts that occur between the antennas and within ideal transmission lines that may be parts of the repeater are accurately proportional to the transmitted frequencies. Whether this proportionality is maintained in design of the other phase-shifting components or not, the feedback loop should be of such over-all design as to maintain symmetry between the transmitted pairs of sidebands, relative to a common reference line if more than a single pair is to be transmitted as in broad-band application. There will be a critical phase relationship of the oscillator output signals supplied to the input converter and to the output mixer for mutual cancellation of one and all pairs of the converted sidebands $(f_o+f_i)$ and $f_o-f_i)$. The phase of the signal of oscillator frequency (other factors unchanged), as applied to mixer 16, determines the phase of line $f_a$ at the input converter relative to the oscillator signal applied to that converter. This phase may be adjusted by shifter 20 in the channel between oscillator 12 and mixer 16, as shown, or at any other suitable stage.

The demonstrated cancellation does not affect the received signal. The equal, symmetrical image frequency which is characteristic of the transmission does not accompany the usual received signal. The received signal may then be amplified far beyond the limited gain permissible with isolated and phased transmitting and receiving antennas of prior art systems. Multiple received signals may effectively be repeated concurrently since the same relative phase of oscillator signals as the input and output converters is operative to suppress "singing" for all values of $f_i$. The high gain permissible for multiple signals is limited by the extent of inequality of the transmitted sidebands and their asymmetry at the input converter in relation to a common reference line.

The higher frequency components of the signal after conversion for the intermediate-frequency amplifier, such as the oscillator signal itself and the sum-frequencies of the oscillator and the sidebands, may be eliminated by filtering. There will remain in the output of converter 10 a signal of twice $f_i$, the cross-product of the signal and image frequencies. This double-frequency component does not tend to establish oscillation. Furthermore, it may be made quite small in relation to the desired modulation products by making the oscillator signal strong relative to the received signal components, as in conventional superheterodyne practice.

It is to be understood that various modifications and changes may be made in this invention without departing from the spirit and scope thereof.

What is claimed is:

1. The combination, in a radio repeater system, of a receiving antenna feeding a converter, a local oscillator adapted to cooperate with said converter to produce an intermediate frequency signal when combined with a signal from said antenna, an amplifier for said intermediate signal, a mixer coupled to said amplifier, buffer and phase control units coupled to said local oscillator and adapted to feed a portion of the output of said local oscillator in proper phase relationship to said mixer, whereby to produce a signal to be transmitted comprising a selected signal and the image thereof, and a transmitting antenna associated with said mixer and adapted to transmit said selected signal.

2. A non-self-oscillating signal repeater comprising the combination of a phase shifter with a signal repeater of the type having equal phase shift and amplification characteristics for both the signal to be relayed and its image signal, said repeater including means for receiving said relayed signal, an input converter connected to said receiving means, an intermediate frequency amplifier connected to said input converter, an output converter connected to said intermediate frequency amplifier, means connected to said output converter for transmitting the amplified signal to be relayed, a portion of the transmitted signal being fed back to said receiving means, and a local oscillator connected to said input converter and to said output converter, the output signal from said output converter comprising upper and lower sidebands consisting of the sum and difference frequencies of the local oscillator signal and the intermediate frequency signal, and said phase shifter being connected between said local oscillator and one of said converters to shift the phase of the local oscillator signal which passes to said converter, the resultant of said phase-shifted local oscillator signal and any local oscillator signal component which has been fed back into the receiving means being, vectorially, in quadrature phase relationship with the line of symmetry between said upper and lower sidebands.

3. A device of the type set forth in claim 2, wherein said phase shifter is connected between said local oscillator and said output converter.

References Cited in the file of this patent

UNITED STATES PATENTS

| | | |
|---|---|---|
| 1,658,851 | Martin | Feb. 14, 1928 |
| 1,668,270 | Farrington | May 1, 1928 |
| 2,279,177 | Plebanski | Apr. 7, 1942 |
| 2,344,813 | Goldstine | Mar. 21, 1944 |
| 2,347,398 | Crosby | Apr. 25, 1944 |
| 2,369,268 | Trevor | Feb. 13, 1945 |